United States Patent
Tamura et al.

(10) Patent No.: US 8,021,057 B2
(45) Date of Patent: Sep. 20, 2011

(54) OPTICAL MODULE AND CABLE UNIT PROVIDED WITH OPTICAL MODULE

(75) Inventors: Mitsuaki Tamura, Yokohama (JP); Wataru Sakurai, Yokohama (JP); Junji Fukui, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 12/529,680

(22) PCT Filed: Nov. 25, 2008

(86) PCT No.: PCT/JP2008/071290
§ 371 (c)(1),
(2), (4) Date: Sep. 2, 2009

(87) PCT Pub. No.: WO2009/069571
PCT Pub. Date: Jun. 4, 2009

(65) Prior Publication Data
US 2010/0098382 A1    Apr. 22, 2010

(30) Foreign Application Priority Data
Nov. 29, 2007  (JP) .................................. 2007-308259

(51) Int. Cl.
G02B 6/36   (2006.01)
G02B 6/43   (2006.01)
(52) U.S. Cl. ............................... 385/75; 385/89; 385/92
(58) Field of Classification Search .......................... None
See application file for complete search history.

(56) References Cited

U.S. PATENT DOCUMENTS

| | | | | |
|---|---|---|---|---|
| 4,478,487 A | * | 10/1984 | Obeissart | 385/66 |
| 4,756,593 A | * | 7/1988 | Koakutsu et al. | 385/139 |
| 5,125,056 A | * | 6/1992 | Hughes et al. | 385/59 |
| 6,334,012 B1 | * | 12/2001 | Yoon et al. | 385/24 |
| 7,065,604 B2 | | 6/2006 | Konda et al. | |
| 7,118,294 B2 | | 10/2006 | Hamasaki et al. | |

(Continued)

FOREIGN PATENT DOCUMENTS

JP    H10-048435 A    2/1998

(Continued)

OTHER PUBLICATIONS

Chinese Office Action of the corresponding Chinese Application No. 200880009644.X, dated Apr. 20, 2011.

*Primary Examiner* — Mike Stahl
(74) *Attorney, Agent, or Firm* — Global IP Counselors, LLP (57) ABSTRACT

Operation efficiency can be dramatically improved and a smaller configuration can be obtained by simplifying the optical connection. An optical module has an electrical connector to connect a device; an optical element unit being electrically connected to the electrical connector and provided with optical elements to convert electrical signals and optical signals and emitting or receiving light; an optical ferrule, having a plurality of optical fiber insertion holes, to hold optical fibers inserted into the plurality of optical fiber insertion holes so as to allow the fibers to be optically connected to the optical element; and an optical cable inlet to introduce an end part of an optical cable provided with the optical fibers. The cable unit with an optical module has an optical cable that includes a plurality of optical fibers and an optical module provided at two ends of the optical cable.

5 Claims, 8 Drawing Sheets

U.S. PATENT DOCUMENTS

| | | | |
|---|---|---|---|
| 2007/0014522 A1 | 1/2007 | Yamaguchi et al. | |
| 2007/0237463 A1* | 10/2007 | Aronson | 385/89 |
| 2008/0044140 A1* | 2/2008 | Wang et al. | 385/88 |
| 2008/0062980 A1* | 3/2008 | Sunaga et al. | 370/389 |
| 2008/0164406 A1* | 7/2008 | Rollinger | 250/239 |
| 2008/0226228 A1* | 9/2008 | Tamura et al. | 385/33 |
| 2008/0247713 A1* | 10/2008 | Tamura et al. | 385/93 |
| 2009/0010600 A1* | 1/2009 | Kim et al. | 385/90 |

FOREIGN PATENT DOCUMENTS

| | | |
|---|---|---|
| JP | 2000-193843 A | 7/2000 |
| JP | 2004-151296 A | 5/2004 |
| JP | 2006-317630 A | 11/2006 |
| JP | 2007-025272 A | 2/2007 |
| JP | 2007-178490 A | 7/2007 |

* cited by examiner

OPTICAL MODULE AND CABLE UNIT PROVIDED WITH OPTICAL MODULE

CROSS-REFERENCE TO RELATED APPLICATIONS

This U.S. National stage application claims priority under 35 U.S.C. §119(a) to Japanese Patent Application No. 2007-308259, filed in Japan on Nov. 29, 2007, the entire contents of which are hereby incorporated herein by reference.

TECHNICAL FIELD

The present invention relates to an optical module and a cable unit provided with the optical module which are used for transmitting signals, e.g., from a personal computer to a display device.

BACKGROUND ART

Japanese Laid-open Patent Application No. 2007-25272 discloses an optical DVI cable system, which is called "a cable provided with an optical module" in the present application, used for transmitting digital signals, e.g., from a personal computer to a display apparatus. In the optical DVI cable system, a plurality of signals (e.g., R, G, and B signals) are converted from an electrical signal to an optical signal in a DVI connector located at the end of the cable.

SUMMARY OF THE INVENTION

Technical Problem

An object of the present invention is to provide an optical module, and a cable unit provided with the optical module that can improve operation efficiency and ensure a smaller size by simplifying the optical connection of optical elements and optical fibers.

Technical Solution

In order to achieve the object, there is provided an optical module comprising (1) an electrical connector to connect a device, (2) an optical element unit being electrically connected to the electrical connector and provided with optical elements which convert electrical signals and optical signals to each other so as to emit or receive light; (3) an optical ferrule, having a plurality of optical fiber insertion holes, to hold optical fibers inserted into the plurality of optical fiber insertion holes so as to allow the fibers to be optically connected to the optical elements; and (4) an optical cable inlet to introduce an end part of an optical cable provided with the optical fibers.

A surplus-length receptacle to store the bundled surplus length of the optical fibers is preferably provided between the optical cable inlet and the optical ferrule. A difference in level is preferably provided between the optical cable inlet and the optical ferrule. A daughter board is preferably provided for mounting the optical element unit and the optical ferrule.

According to another aspect of the present invention, there is provided a cable unit provided with an optical module that includes an optical cable having a plurality of optical fibers and an optical module being provided at two ends of the optical cable. The cable unit provided with an optical module comprises (1) an electrical connector to connect a device; (2) an optical element unit being electrically connected to the electrical connector and provided with optical elements which convert electrical signals and optical signals to each other so as to emit or receive light; (3) an optical ferrule, having a plurality of optical fiber insertion holes, to hold optical fibers inserted into the plurality of optical fiber insertion holes so as to allow the fibers to be optically connected to the optical elements; and (4) an optical cable inlet to introduce an end part of an optical cable. In the cable unit provided with an optical module of the present invention, the plurality of optical fibers are bundled and stored between the optical cable inlet and the optical ferrule.

DETAILED DESCRIPTION OF THE INVENTION

Embodiments of the present invention are described below with reference to the drawings. The drawings are used for descriptive purposes and are not meant to limit the scope of the invention. The identical reference numerals indicate the same portions in the drawings in order to avoid redundant description. The dimensional ratios in the drawings are not always exact.

First Embodiment

Figure 1:
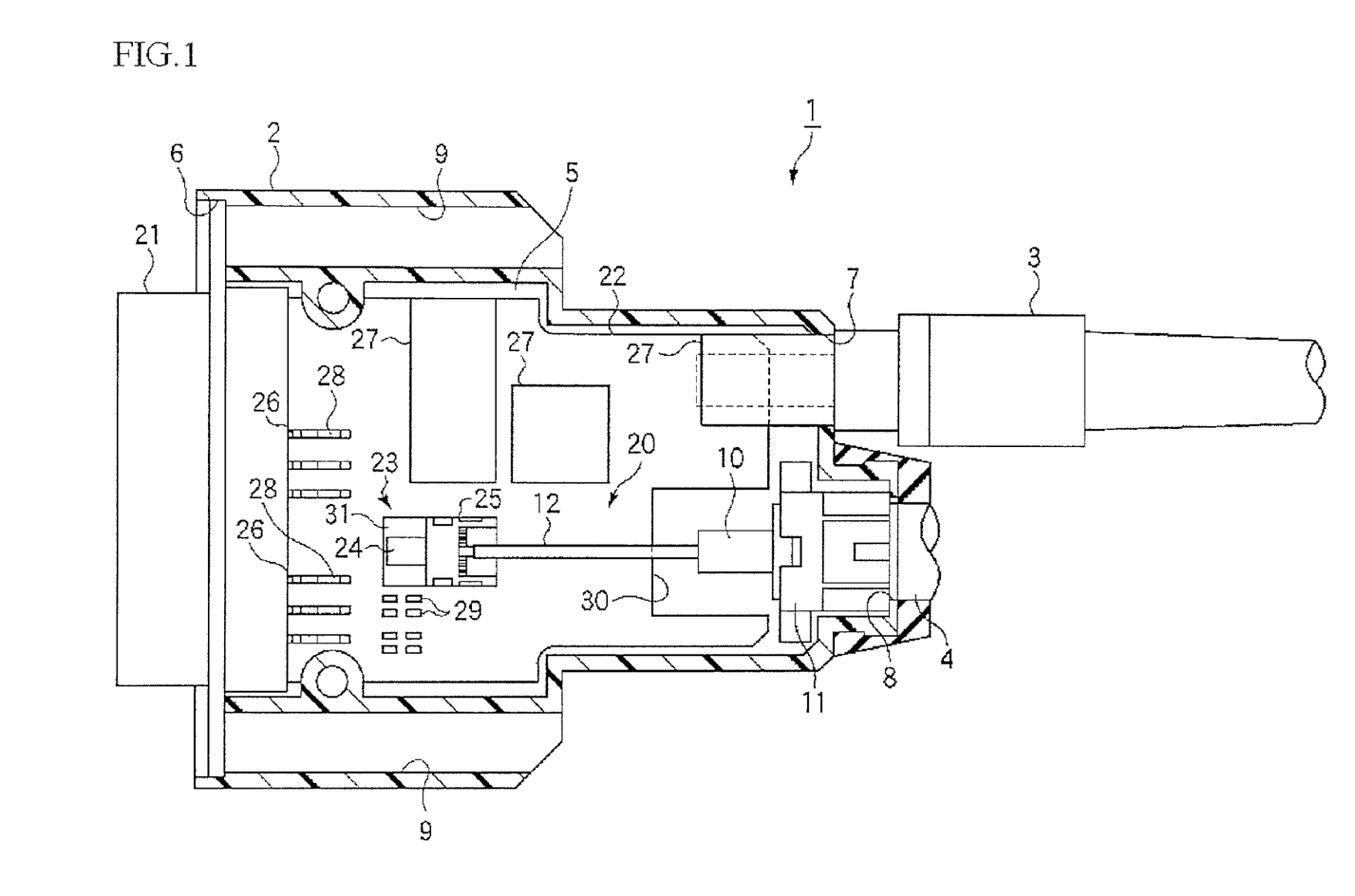
FIG. 1 is a front view showing the optical module, which is stored in the connector housing, according to the first embodiment of the present invention.
Figure 2:
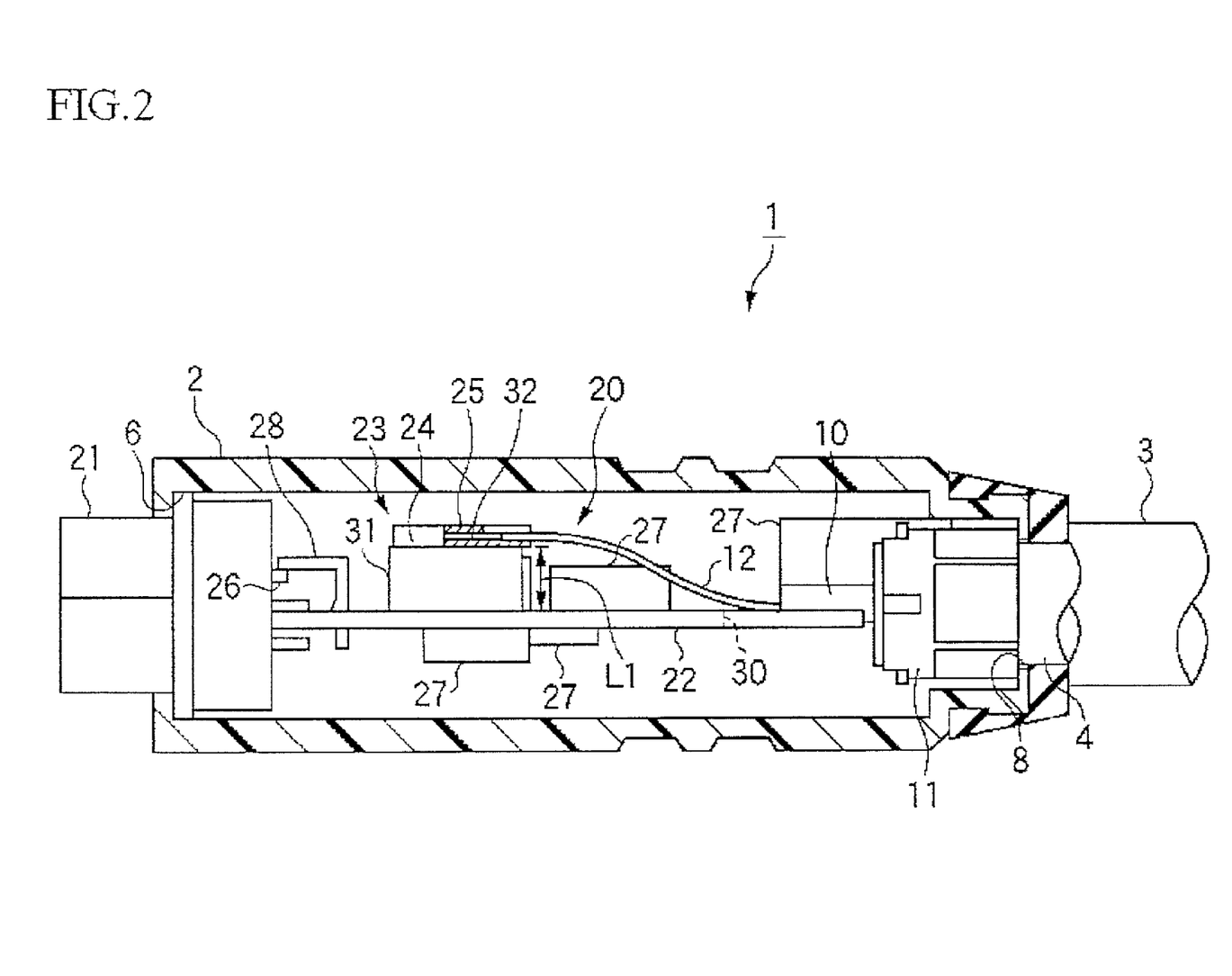
FIG. 2 is a side view of the optical module shown in FIG. 1.

FIG. 1 is a front view showing an optical module 20, which is stored in the connector housing 2, according to the first embodiment of the present invention; and FIG. 2 is a side view of the optical module 20 shown in FIG. 1. The optical module 20 constitutes a cable unit 1 having the optical module in combination with an external power supply cable 3, an optical cable 4, and another optical module (not shown) having the same configuration. Optical signals can be transmitted from a personal computer to a display device in a manner where the optical module 20 at one end of the cable unit 1 having optical modules is connected to the personal computer, and the optical module at the other end is connected to the monitor or another display apparatus.

The connector housing 2 may, for example, have a vertically bisected resin construction. A motherboard holder 5 is located at the center of the connector housing 2, and an electrical connector mount 6 is formed on the front side of the holder 5 and an external power supply cable mount 7 and an optical cable mount 8 are formed on the rear side of the holder 5. A terminal part 10 of the optical cable 4 is secured to the connector housing 2 with a caulking ring 11. A pair of screw insertion holes 9 for inserting screws (not shown) is formed in the two sides of the connector housing 2.

The optical module 20 is provided with an electrical connector 21, a motherboard 22, an optical element unit 23 having a plurality of optical elements 24, and an optical ferrule (optical connecting portion) 25. The electrical connector 21 stores I/O terminals 26 inside the same number of terminal cavities (not shown), and is secured to the electrical connector mount 6 of the connector housing 2. The electrical connector 21 is to be connected to a personal computer, a display apparatus, or the like.

The motherboard 22 is secured to the motherboard holder 5 of the connector housing 2, and a plurality of electrical elements 27 such as LSIs, ICs, and regulators is mounted on the front and back surfaces of the motherboard. The motherboard 22 has a plurality of I/O terminals 28 electrically connected to the plurality of I/O terminals 26 of the electrical connector 21, and I/O terminals 29 for supplying power from the external power supply cable 3 to the electrical elements 27 and transmitting electrical signals from the optical elements 24. The motherboard 22 has a rectangular notch 30 that functions as an optical cable inlet and is provided around the terminal part 10 of the optical cable 4 secured to the optical cable mount 8.

The optical element unit 23 is mounted on a stacking connector 31 and has a plurality of optical elements 24, which are relatively inexpensive light-receiving and -emitting elements such as a long-wave surface emitting laser (VCSEL) or a PD array. The plurality of optical elements 24 are electrically connected to the I/O terminals 26 of the electrical connector 21 at the output side thereof.

The optical ferrule 25 is mounted on the stacking connector 31 closer to the optical cable 4 in the same manner as the optical element unit 23. The optical ferrule 25 has a plurality of optical fiber insertion holes 32. A plurality of optical fibers 12 extended from the terminal part 10 of the optical cable 4 and introduced from the notch 30 of the motherboard 22 is inserted into the plurality of optical fiber insertion holes 32. The optical ferrule 25 is configured so that the plurality of optical fibers 12 are connected to the plurality of optical elements 24. The optical elements 24 convert to electrical signals the optical signals transmitted from the optical fibers 12. The converted electrical signals are amplified by the electrical elements 27 after having passed through the plurality of I/O terminals 29, and are transmitted to the I/O terminals 28.

The stacking connector 31 has a height L1. The optical fibers are thereby flexed, and excessive force is not applied because of the flection.

In the optical module 20 and the cable unit 1 having the module, the optical fibers 12 are not required to be optically connected one at a time to the optical elements 24, and a dramatic improvement in operation efficiency can be ensured by simplifying the optical connection of the optical fibers 12 using multiple connections in a single process. Additionally, since the optical module 20 can be made smaller, the cable unit 1 having an optical module for transmitting digital signals from a personal computer to a display device can be obtained at low cost.

Second Embodiment

Figure 3:
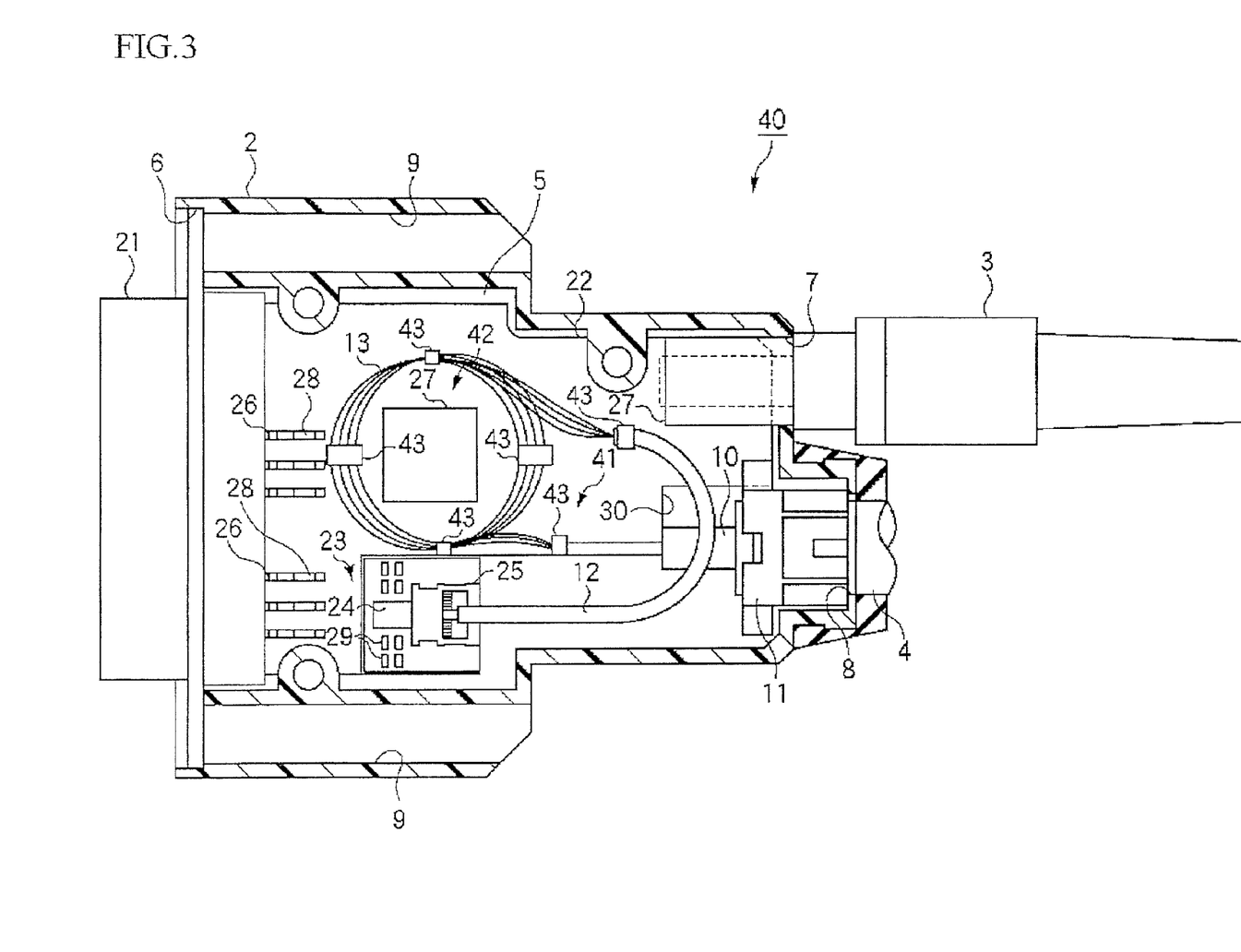
FIG. 3 is a front view showing the optical module, which is stores in the connector housing, according to the second embodiment of the present invention.
Figure 4:
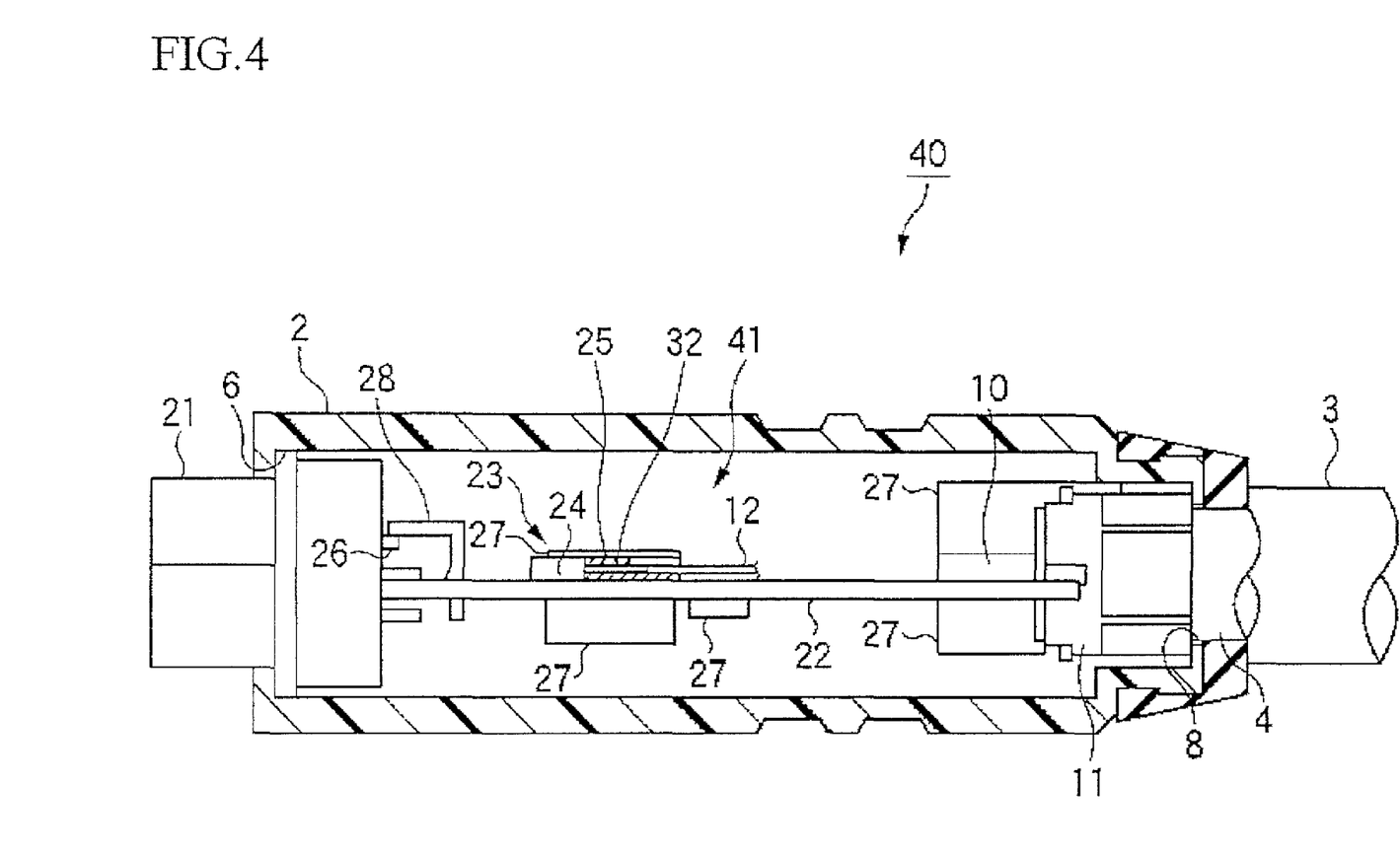
FIG. 4 is a side view of the optical module shown in FIG. 3.

FIG. 3 is a front view showing the optical module 41, which is stored in the connector housing, according to the second embodiment of the present invention; and FIG. 4 is a side view of the optical module 41 shown in FIG. 3. In the optical module 41, the optical ferrule 25 and the optical element unit 23 are mounted on the motherboard 22 without the use of a stacking connector. As shown in FIGS. 3 and 4, the optical ferrule 25 is the only optical ferrule within the connector housing 2. Also, a surplus-length receptacle 42 to store a bundled surplus length part 13 of the optical fibers 12 is provided between the optical ferrule 25 and the terminal part 10 of the optical cable 4. As shown in FIG. 3, the optical fibers of the bundled surplus length part 13 are flexed and coiled together adjacent to the optical ferrule 25.

The optical fibers 12 extended from the terminal part 10 are wound over the motherboard 22 in a manner that does not degrade the optical waveguide characteristics, and are then introduced to the optical ferrule 25. The optical fibers 12 thus wound are bundled and supported by a plurality of bundling parts 43 on the motherboard 22. The optical ferrule 25 is disposed at the end part of the motherboard 22, and the motherboard 22 behind the optical ferrule 25 is removed. A configuration is thereby obtained in which the optical fibers 12 can be readily inserted during the fiber-mounting operation.

In the optical module 41 and the cable unit 40 having an optical module according to the second embodiment, the surplus length of the optical fibers 12 is bundled and stored in the surplus-length receptacle 42 between the optical ferrule 25 and the terminal part 10 of the optical cable 4 and excessive force is prevented from being applied to the optical ferrule 25. Since the motherboard 22 behind the optical ferrule 25 has been removed, the optical fibers 12 can be readily inserted and the fiber-mounting work can be improved.

Third Embodiment

Figure 5:
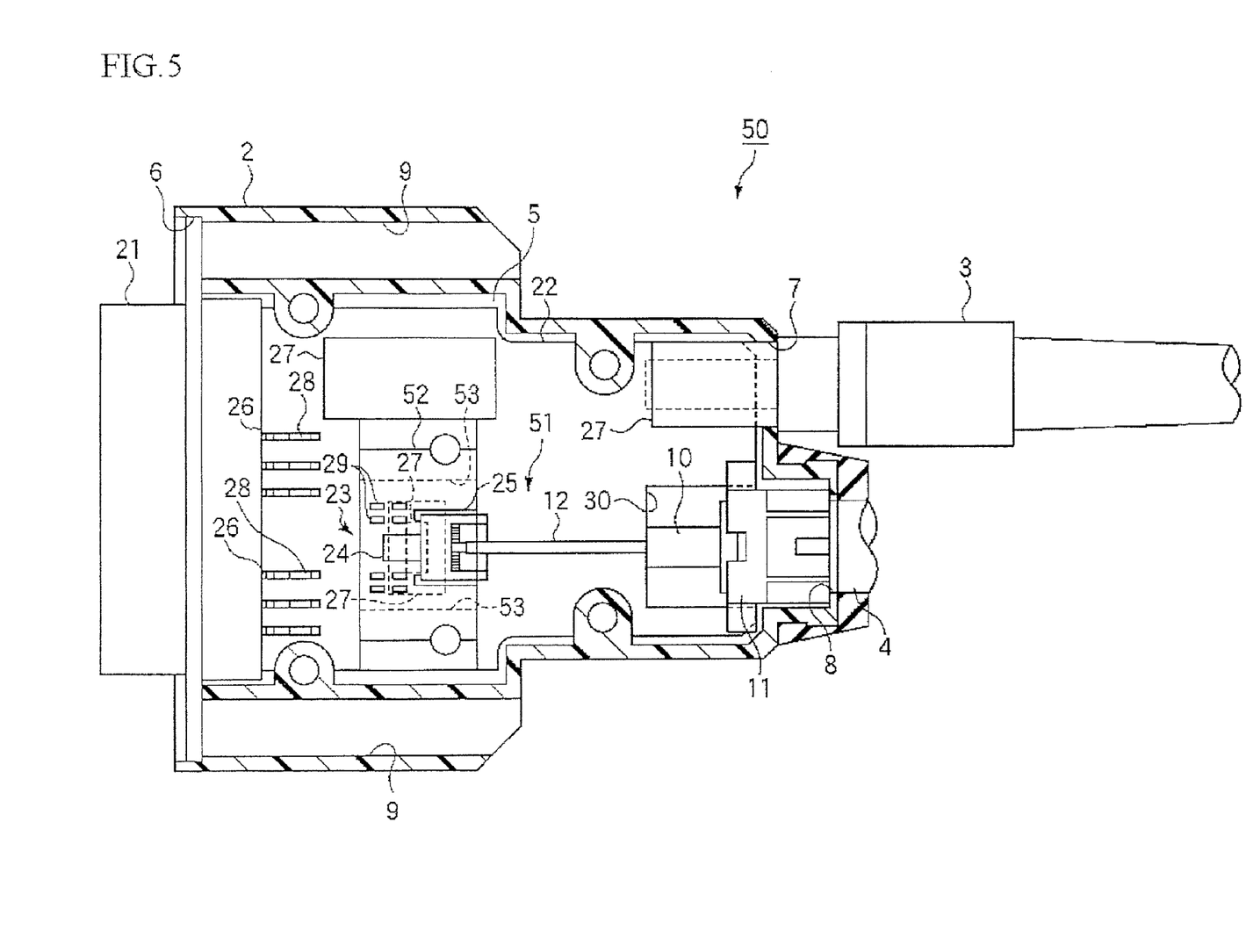
FIG. 5 is a front view showing the optical module, which is stored in the connector housing, according to the third embodiment of the present invention.
Figure 6:
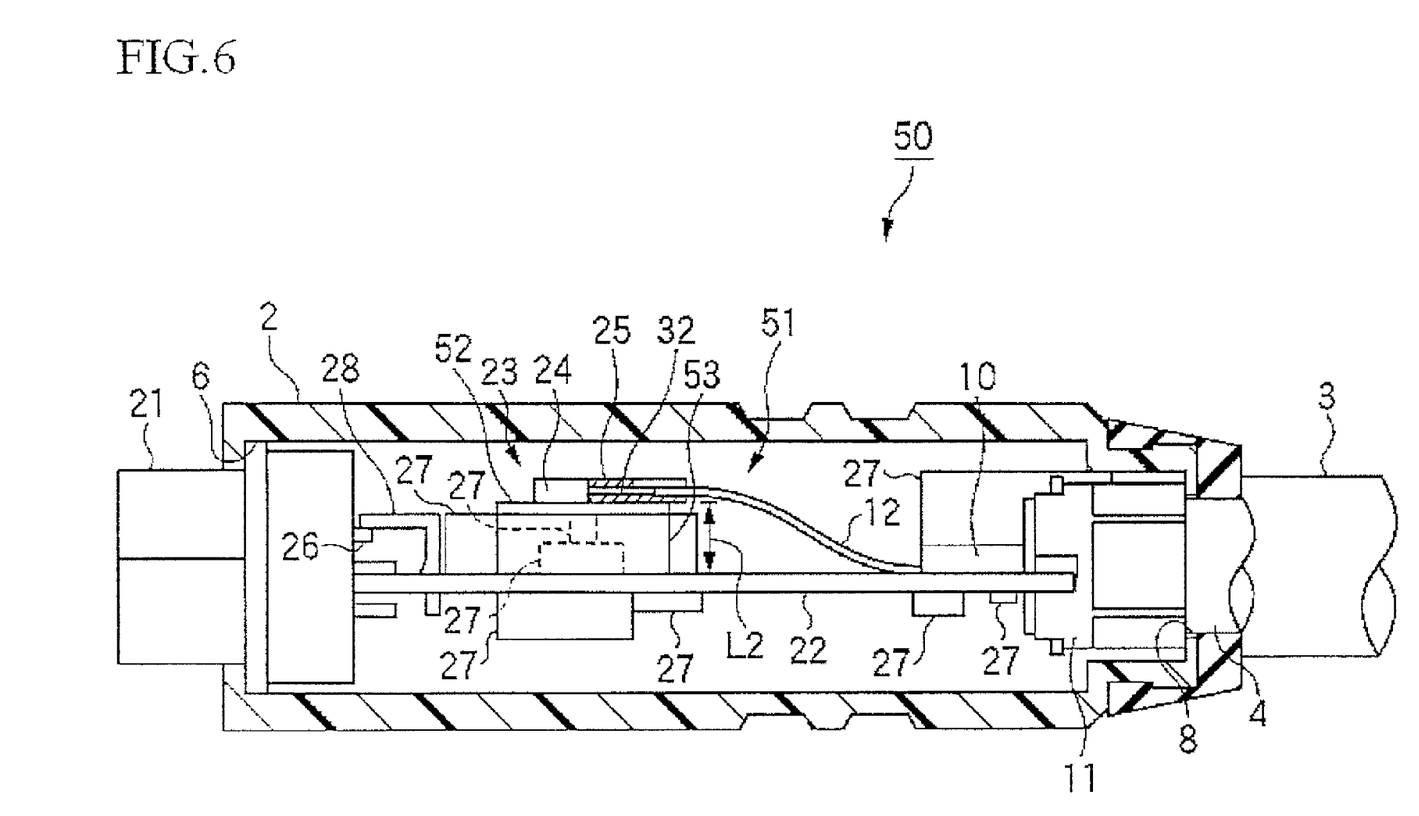
FIG. 6 is a side view of the optical module shown in FIG. 5.

FIG. 5 is a front view showing the optical module 51, which is stored in the connector housing, according to the third embodiment of the present invention; and FIG. 6 is a side view of the optical module 51 shown in FIG. 5. In the optical module 51, the optical ferrule 25 and the optical element unit 23 are mounted on a daughter board 52 that is separate from the motherboard 22 and is sufficiently smaller than the motherboard 22. Also, the daughter board 52 is suspended over and mounted on a pair of heat dissipation plates 53 disposed on the two side parts of the electrical elements 27 mounted in the center of the motherboard 22. The optical ferrule 25 is mounted on the daughter board 52 above the heat dissipation plates 53, and therefore rises above the motherboard 22 by a height dimension L2. Therefore, the optical fibers 12 extended from the terminal part 10 are introduced to the optical ferrule 25 with a flection.

In the optical module 51 and the cable unit 50 having an optical module according to the third embodiment, excessive force is prevented from being applied to the optical ferrule 25 by providing a difference in level between the optical ferrule 25 and the terminal part 10 of the optical cable 4. Also, in the optical module 51 and the cable unit 50 having an optical module according to the third embodiment, the optical ferrule 25 is mounted on the daughter board 52 together with the optical element unit 23, whereby the optical ferrule 25 and optical element unit 23 can be handled as a single component. Accordingly, the assembly step can be simplified, the man-hour required to take care of the components can be reduced, and manufacturability can be improved.

Fourth Embodiment

Figure 7:
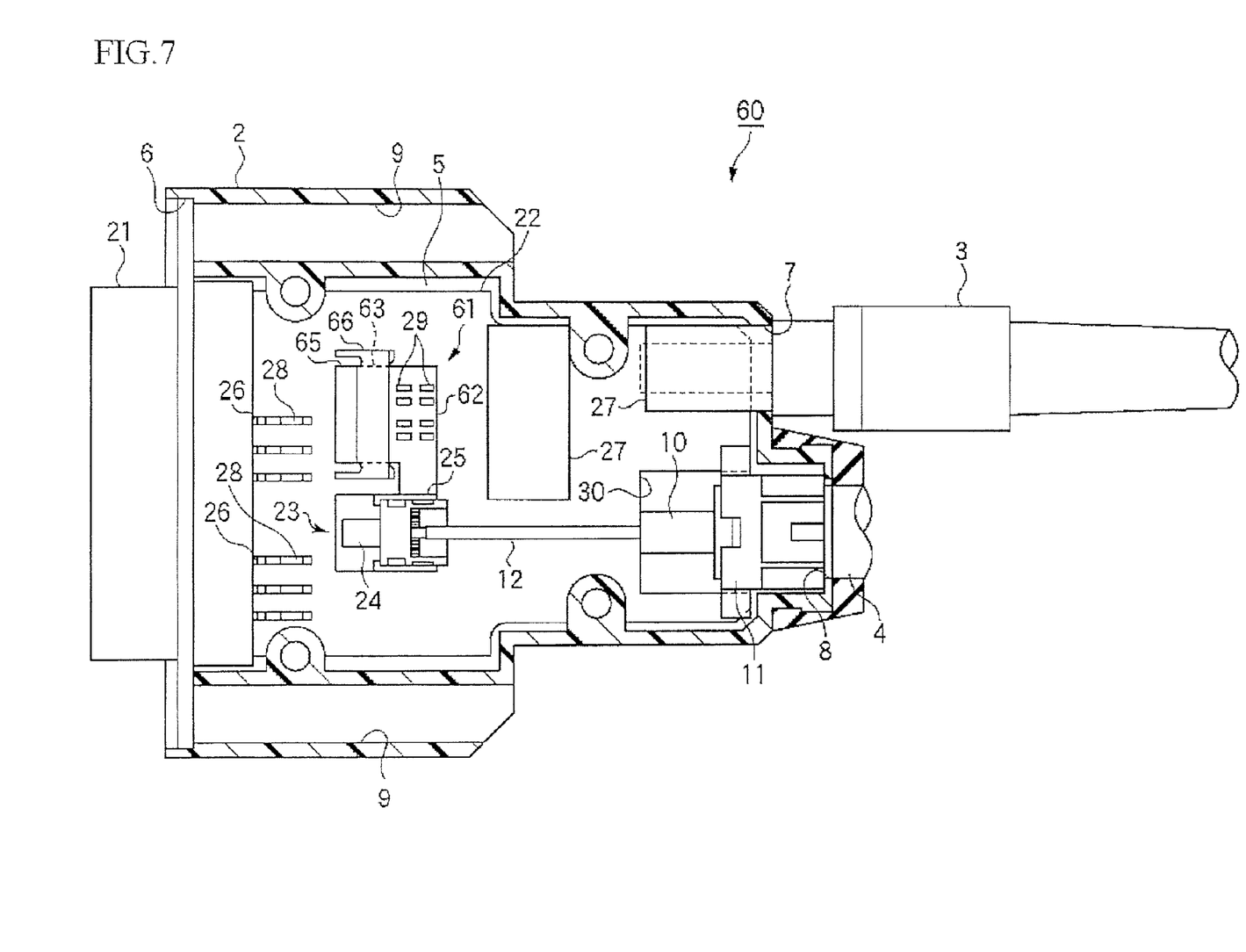
FIG. 7 is a front view showing the optical module, which is stored in the connector housing according to the fourth embodiment of the present invention.
Figure 8:
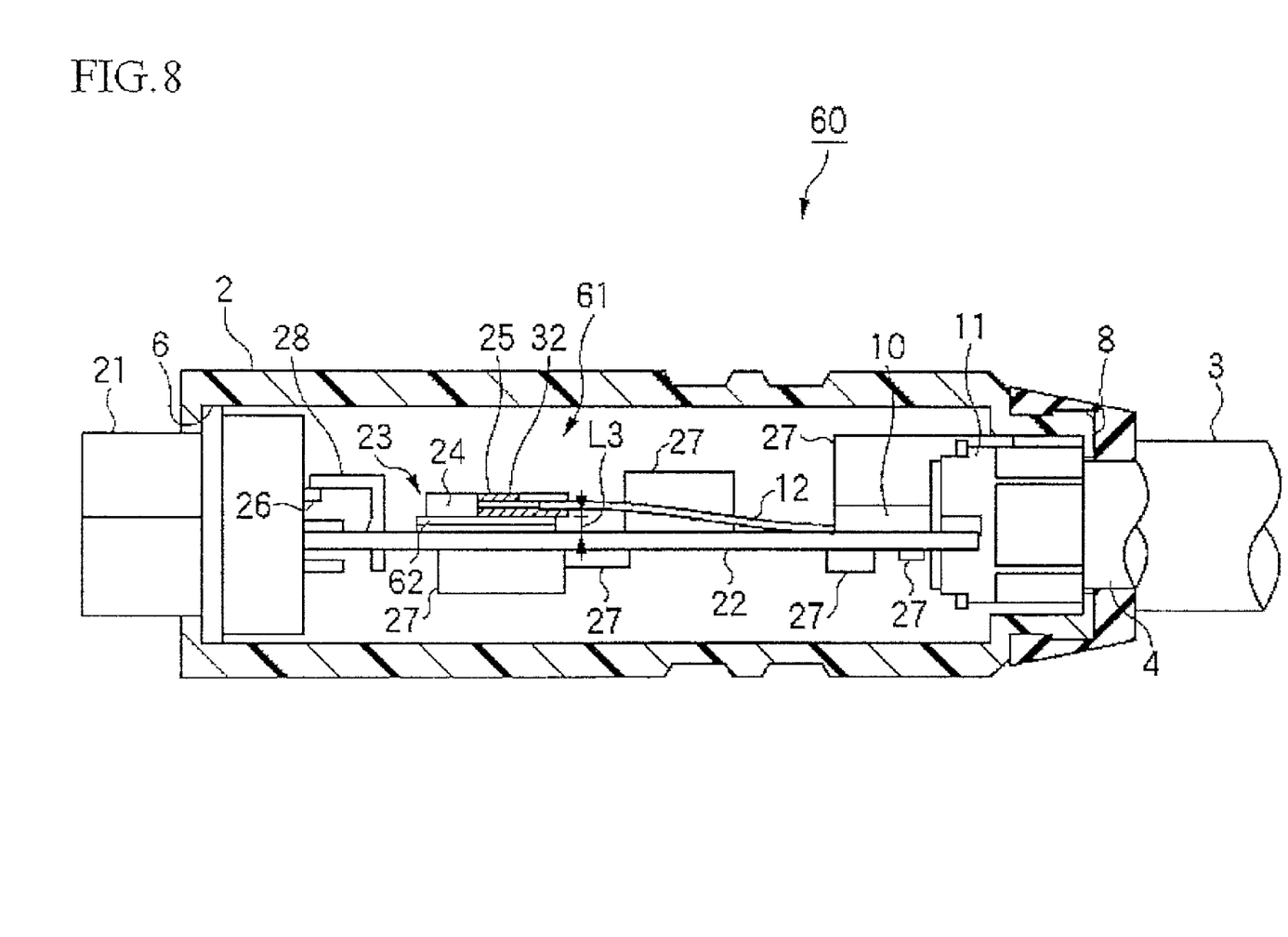
FIG. 8 is a side view of the optical module shown in FIG. 7.

FIG. 7 is a front view showing the optical module 61, which is stored in the connector housing, according to the fourth embodiment of the present invention; and FIG. 8 is a side view of the optical module 61 shown in FIG. 7. In the optical module 61, the optical ferrule 25 and the optical element unit 23 are mounted on a daughter board 62 that is separate from the motherboard 22 and is sufficiently smaller than the motherboard 22. Also, a connector terminal 63 for a flexible printed circuit (FPC) is provided to the daughter board 62.

The daughter board 62 is mounted on the motherboard 22 via an FPC 65, which may, e.g., be a sheet member made of copper, and therefore rises above the motherboard 22 by a height dimension L3. Accordingly, the optical fibers 12 extended from the terminal part 10 are introduced to the optical ferrule 25 with a flection. A connector 66 for the FPC 65 is connected to the FPC connector terminal 63 to be used for transmitting electrical signals.

In the optical module 61 and the cable unit 60 having an optical module according to the fourth embodiment, excessive force is prevented from being applied to the optical ferrule 25 by providing a difference in level between the optical ferrule 25 and the terminal part 10 of the optical cable 4. Also, the optical ferrule 25 is mounted on the daughter board 62 together with the optical element unit 23, whereby the optical ferrule 25 and optical element unit 23 can be handled as a single component. Accordingly, the assembly step can be simplified, the man-hour for required to take care of the components can be reduced, and manufacturability can be improved. Also, the height dimension can be dramatically reduced and a further reduction in size can be achieved by using an FPC 65 for signal transmission.

The optical module and the cable unit provided with an optical module according to the present invention are not limited to the embodiments described above, and suitable modifications and improvements can be made. For example, the number of optical fibers is not limited in any way, and it is preferred that any plurality of optical fibers be used.

The present application is based on Japanese Patent Application (No. 2007-308259) filed on Nov. 29, 2007, which is incorporated herein by reference.

INDUSTRIAL APPLICABILITY

In the optical module and the cable unit provided with an optical module according to the present invention, operation efficiency can be dramatically improved by simplifying the optical connection of the optical fibers so as to allow multiple connections in a single process, making it possible to provide an optical module and a cable unit provided with an optical module that can be made smaller.

What is claimed is:
1. An optical module comprising:
a motherboard;
an electrical element mounted to the motherboard;
a daughter board mounted to the motherboard;
an electrical connector coupled to the motherboard and being configured to connect a device;
an optical element unit mounted to the daughter board, the optical element unit being electrically connected to the electrical connector and provided with optical elements to convert electrical signals and optical signals to each other so as to emit or receive light;
an optical ferrule mounted to the daughter board, the optical ferrule having a plurality of optical fiber insertion holes, to hold optical fibers inserted into the plurality of optical fiber insertion holes so as to allow the fibers to be optically connected to the optical elements; and
an optical cable inlet to introduce an end part of an optical cable provided with the optical fibers.

2. The optical module according to claim 1, further wherein the daughter board and the mother board are dimensioned such that there is a difference in level between the optical cable inlet and the optical ferrule.

3. A cable unit provided with an optical module comprising:
an optical cable having a plurality of optical fibers; and
an optical module being provided to at least one end of the optical cable,
the an optical module including:
a housing that includes an optical cable inlet dimensioned to introduce an end part of the optical cable,
an electrical connector extending from the housing and configured to connect a device,
an optical element unit supported within the housing, the optical element unit being electrically connected to the electrical connector and provided with optical elements to convert electrical signals and optical signals to each other so as to emit or receive light, and
an optical ferrule supported within the housing having a plurality of optical fiber insertion holes to hold each of the plurality of optical fibers of the optical cable inserted into the plurality of optical fiber insertion holes so as to allow the optical fibers to be optically connected to the optical elements, the optical ferrule being the only optical ferrule within the housing, wherein the housing and the optical cable inlet are dimensioned such that the optical fibers extend between the end part of the optical cable and the optical ferrule flexed within the housing.

4. The cable unit provided with an optical module according to claim 3, wherein the plurality of optical fibers includes a bundled surplus-length part that is bundled and stored adjacent to the optical ferrule.

5. The optical module according to claim 1, wherein the motherboard and the optical ferrule are spaced apart from one another.

* * * * *